April 14, 1925.  1,533,554
F. H. HOWARD ET AL
BRAKE ATTACHMENT FOR HOISTS
Filed Aug. 27, 1924
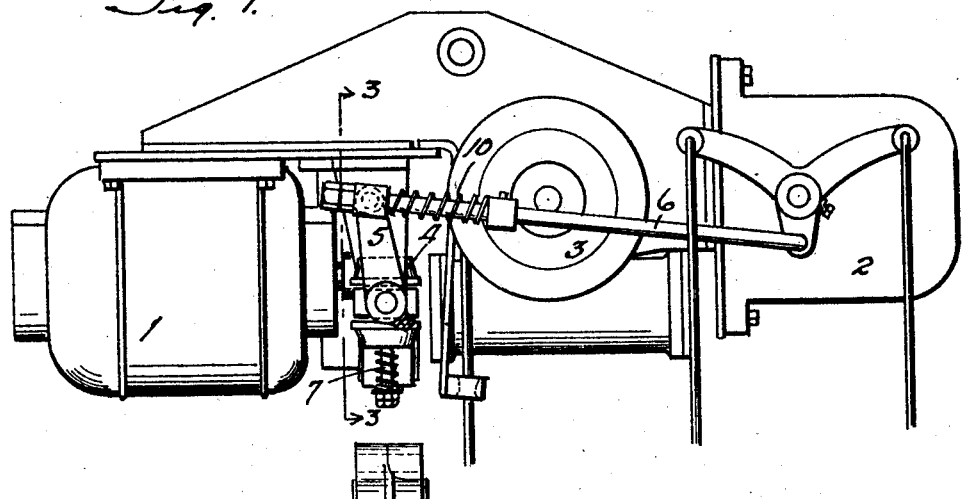
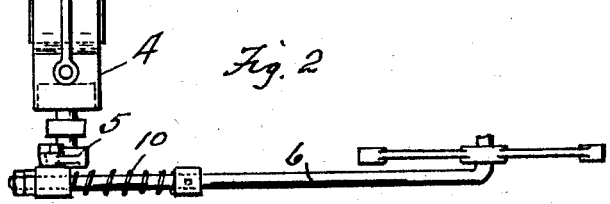
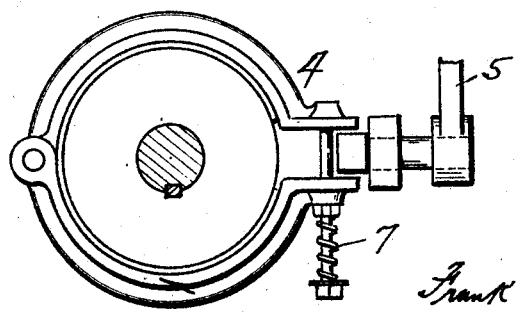
Inventors
Frank H. Howard and
Harry W. Hoffmaster
By
Attorney Patented Apr. 14, 1925.

1,533,554

UNITED STATES PATENT OFFICE.

FRANK H. HOWARD AND HARRY W. HOFFMASTER, OF READING, PENNSYLVANIA, ASSIGNORS TO READING CHAIN AND BLOCK CORPORATION, OF READING, PENNSYLVANIA, A CORPORATION OF PENNSYLVANIA.

BRAKE ATTACHMENT FOR HOISTS.

Application filed August 27, 1924. Serial No. 734,368.

*To all whom it may concern:*

Be it known that we, FRANK H. HOWARD and HARRY W. HOFFMASTER, citizens of the United States, residing at Reading, in the county of Berks and State of Pennsylvania, have invented certain new and useful Improvements in Brake Attachments for Hoists, of which the following is a specification.

This invention relates to improvements in brake attachments for hoists and it pertains more particularly to electric hoists.

The object in the present invention lies solely in a means for controlling the spring actuated brake in such manner as to effect a regulation of the lowering movement of the load, that is, a means of controlling the brake controlling spring.

The invention consists of providing a suitable spring means located between the controller and the brake spring, and which will act to control the brake opening spring when the load is descending.

The invention is more fully described in the following specification and clearly illustrated in the accompanying drawing, in which we have shown in—

Figure 1 a side elevational view of a hoist with our brake attachment located thereon, and in Figure 2 a plan view of the controller lever with the spring shown interposed between it and the brake mechanism.

The numeral 1 designates the motor, 2 the controller 3 the drum and 4 the brake mechanism of an ordinary electric hoist of the character to which our invention is applicable.

The brake mechanism is, as usual, provided with a brake lever 5, which is ordinarily connected to the controller by a controller rod 6, to the end that the brake mechanism is put into action through the controller lever.

The numeral 7 designates the brake-actuating spring.

The connection between this braking mechanism and the controller has heretofore been more or less rigid, and we find that in order to regulate the action of this brake actuating spring, a certain resiliency is required, so that the descending load may be kept under control at all times, and a too rapid descent avoided, and we accomplish this object by interposing a spring 10 in the connection between the controller and the brake actuating spring, or rather between the controller and the spring-controlled brake lever 5, and we have shown this spring 10 located on one end of the controller lever where it may act in its proper function as between the controller rod and the brake lever, through the end of which the controller rod has a sliding engagement.

It will be noted therefore, that, when the load is descending, the actuation of the controller lever, in the usual manner, will put this spring into play and so affect the brake through the lever 5 and the spring connection 10 as to ease the downward action of the load and control the movement thereof.

The exact location of this spring means is not important, as it may be located at any point between the controller and the brake-actuating spring or the brake lever actuated by said spring, the construction illustrated being a simple form of the invention.

Having thus fully described the invention, what we claim and desire to secure by Letters Patent is:—

1. A brake attachment for electric hoists, comprising a brake, a brake lever, a spring for actuating the brake, a controller, a controller lever slidably connected to the brake lever, and a spring interposed between the controller lever and the brake lever whereby the lowering action of the hoist is controlled.

2. The combination of a motor, a controller, a brake mechanism, a controller rod connecting the controller and the brake mechanism, a brake actuating spring on the brake, and a supplemental spring interposed between the controller rod and the spring actuated brake lever, whereby the brake action is controlled in one direction.

3. In a hoist of the character described, the combination of a motor, a controller, a brake mechanism, a brake lever a spring for actuating the brake, a controller rod connected with both the controller and the brake lever, and a spring located on the controller rod between it and the brake lever to control the brake actuating spring when the load of the hoist is descending.

In testimony whereof we affix our signatures.

FRANK H. HOWARD.
HARRY W. HOFFMASTER.